United States Patent
Douglas et al.

(10) Patent No.: US 6,269,400 B1
(45) Date of Patent: Jul. 31, 2001

(54) METHOD FOR DISCOVERING AND REGISTERING AGENTS IN A DISTRIBUTED NETWORK

(75) Inventors: Daniel G. Douglas, San Jose; Thomas E. Guinane, Sr., Morgan Hill; Vinh-Thuan Nguyen-Phuc, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/121,552

(22) Filed: Jul. 22, 1998

(51) Int. Cl.[7] ........................................... G06F 13/00
(52) U.S. Cl. .................................................. 709/224
(58) Field of Search ........................ 364/DIG. 1 MS File, 364/DIG. 2; 709/200, 202, 218, 220, 221, 222, 226, 223, 224

(56) References Cited

U.S. PATENT DOCUMENTS

| | | |
|---|---|---|
| 5,185,860 | 2/1993 | Wu . |
| 5,446,896 | 8/1995 | Hegarty . |
| 5,522,042 | 5/1996 | Fee et al. . |
| 5,561,769 | 10/1996 | Kumar et al. . |
| 5,644,720 | 7/1997 | Boll et al. . |
| 5,649,186 | 7/1997 | Ferguson . |
| 5,659,729 | 8/1997 | Nielsen . |
| 5,706,508 | 1/1998 | Chen et al. . |
| 5,708,772 | 1/1998 | Zeldin et al. . |
| 5,710,885 | * 1/1998 | Bondi ................................. 709/224 |

OTHER PUBLICATIONS

K. Obraczka, P.B. Danzig, and S.–H. Li "Internet Resource Discovery Service," Computer, IEEE Sep. 1993, pp. 8–22.
M.F. Schwartz, "Internet Resource Discovery at the University of Colorado," Computer, IEEE Sep. 1993, pp. 25–35.
Julian Assange "Stobe VI.03 released" pp. 1–S.Last, Nov. 27, 1995.*

* cited by examiner

Primary Examiner—Robert B. Harrell
(74) Attorney, Agent, or Firm—Robert O. Guillot; Oppenheimer Wolff & Donnelly LLP

(57) ABSTRACT

A method for automatic discovery and registration of available agents on a distributed network using universally accepted protocols is disclosed. In particular, the present invention takes advantage of the situation that TCP/IP (Transmission Control Protocol/Internet Protocol) and HTTP (Hypertext Transport Protocol) are open protocols that have been widely accepted for a variety of applications including the immensely popular and universal Internet as well as intranets. Many devices and/or services from various vendors now conform to TCP/IP and provide an HTTP (web) server with their devices and/or services. The present invention provides a method that generates a list of addresses from a set of given criteria identifying the possible addresses for the available agents, detects for the availability of agents at those addresses, and receives and compiles the returned information (if any) from the agents at the respective addresses.

12 Claims, 3 Drawing Sheets

METHOD FOR DISCOVERING AND REGISTERING AGENTS IN A DISTRIBUTED NETWORK

FIELD OF THE INVENTION

The present invention generally relates to methods for determining accessible devices and/or services on a network, and more particularly, to methods for automatic detection and registration of accessible devices and/or services on a distributed network.

BACKGROUND OF THE INVENTION

In a distributed network environment where there are numerous servers each providing access to a particular service or device, there may be a central manager residing on a server that has been designated the task to collect information with regard to the available services and/or devices on the network and to make this information available to servers within the network. FIG. 1 illustrates such a network topology wherein a network 10 connects a number of servers 12, 14, 16, 18, and 20. Each server may in term be connected to other devices such as a scanner 22, a printer 24, a fax machine 26, or a plotter 28, or itself may be the service and/or operative device (e.g., disk array file server 12) at a particular network node. Each server connected to the network will have a unique network address, node name, and port number, and can be accessed accordingly. Additionally, each server has an agent responding to requests from other servers.

The task in collecting information with regard to available agents on the network is made complicated by the fact that agents and the associated services and/or devices may become unavailable due to a variety of possible causes, and new agents (and the associated services and/or devices) may be added to the network on an on-going basis as well. Given the dynamic nature of the environment, it becomes important to have an automated, efficient, and compatible method for determining the available agents on a network at any one time.

In prior art technologies, several methods were used to determine and maintain a list of the available agents. In the simplest method, a static list is maintained on a server, and changes to the list have to be manually carried out. This method is not practical in large, complex network environments and is tedious at best. In another prior art technology using a broadcast approach, a server sends a broadcast out to the network requesting any and all available agents to respond and register with the requesting server. However, this approach is only available with certain hierarchical network topology using proprietary protocol. Additionally, this approach generates a great deal of overhead in the broadcast itself because such a blind attempt to communicate with agents on all possible addresses and port numbers consumes an unacceptable level of CPU cycle time and has proven to be unreliable in registering all available agents. In yet another prior art technology, proprietary network protocol is setup in such a manner as to require that each of the agents check-in with a designated server at specified intervals. With this approach, each of the agents would have to be programmed to perform the registration function before it is registered with the network. This method requires an additional layer of compatibility and protocol, and thereby increases the cost associated with this task.

Ideally, it would be desirable to have a non-proprietary method for accomplishing automatic registration of available agents on a distributed network with this task being performed by any server.

SUMMARY OF THE INVENTION

It is therefore an object of the present invention to provide a method for automatic discovery and registration of available agents on a distributed network.

It is another object of the present invention to provide a method requiring low CPU utilization for conducting automatic discovery and registration of agents on a distributed network.

It is yet another object of the present invention to provide a method for discovering and registering agents on a distributed network using non-proprietary protocols thereby minimizing the need for additional programming of the agents.

Briefly, the present invention provides a method for automatic discovery and registration of the available agents on a distributed network using universally accepted protocols. In particular, the present invention takes advantage of the situation that TCP/IP (Transmission Control Protocol/ Internet Protocol) are open protocols that have been widely accepted for a variety of applications including the immensely popular and universal Internet as well as intranets. Many devices and/or services from various vendors now conform to TCP/IP. Additionally, HTTP (Hypertext Transport Protocol), another pervasive and universal open protocol, has emerged with the proliferation of the Internet web pages. Similarly, devices and/or services from various vendors have been designed to provide an HTTP server (web server) within their respective devices and/or services.

Given this scenario, the present invention provides a method that generates a list of addresses from a defined management scope (a term of art which defines a set of criteria identifying the possible addresses of the available agents), detects the availability of agents at the specified addresses, and receives and compiles the returned information (if any) from the agents at the respective addresses.

An advantage of the present invention is that it provides a method for automatic discovery and registration of available agents on a distributed network.

Another advantage of the present invention is that it provides a method requiring low CPU utilization for conducting automatic discovery and registration of agents on a distributed network.

Yet another advantage of the present invention is that it provides a method for discovering and registering agents on a distributed network that uses open protocols thereby requiring minimal programming of the agents.

These and other features and advantages of the present invention will become well understood upon examining the figures and reading the following detailed description of the invention.

IN THE DRAWINGS

DETAILED DESCRIPTION OF THE PREFERRED EMBODIMENTS

The present invention may be implemented using any combination of computer programming software, firmware or hardware. As a preparatory step to practicing the invention or constructing an apparatus, according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer program(s) coded in accordance with the invention. A machine readable program storage medium encoding instructions for executing the method as recited in claim 1.

Figure 1:
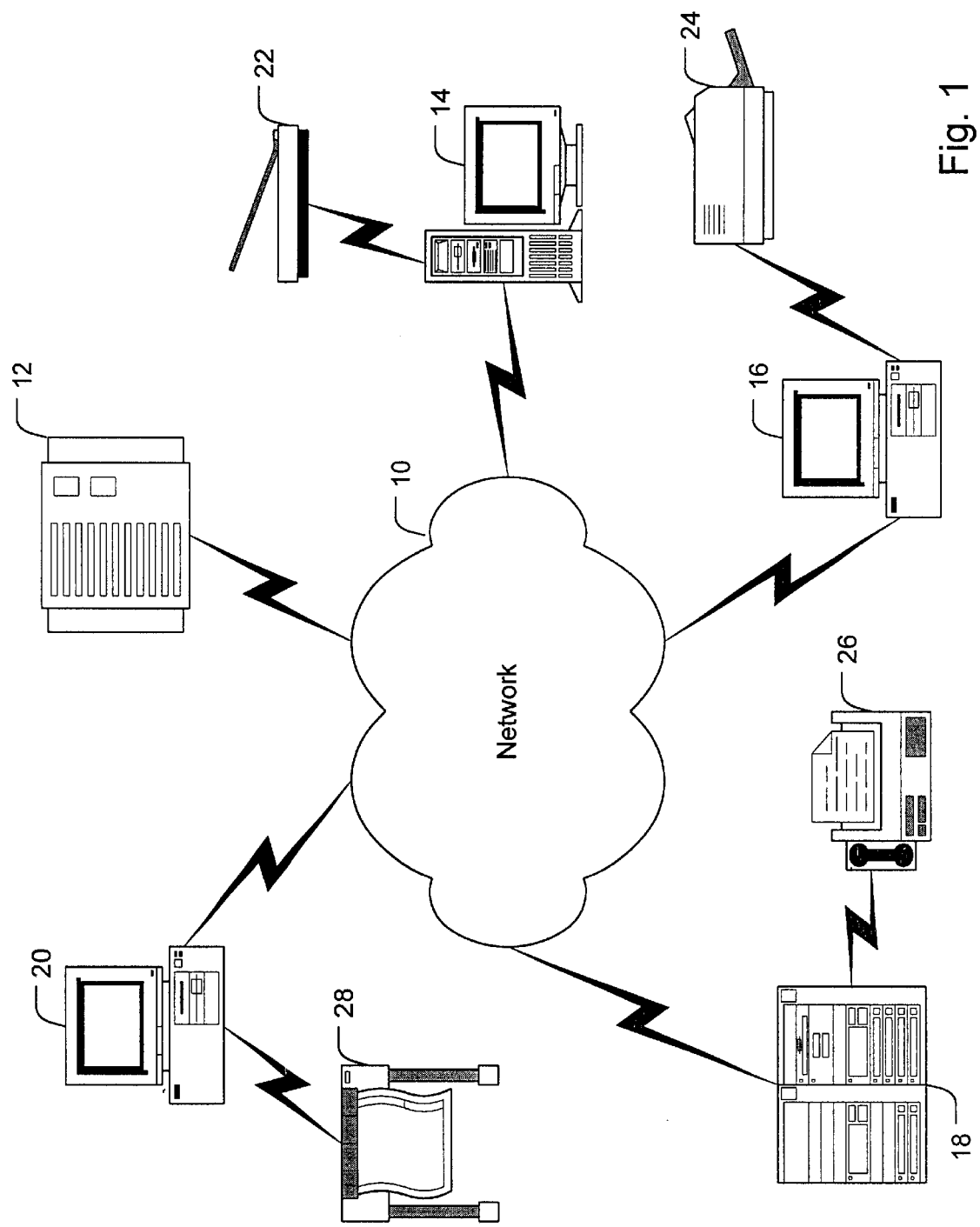
FIG. 1 illustrates a typical distributed network including a number of servers providing access to other services or devices.
Figure 2:
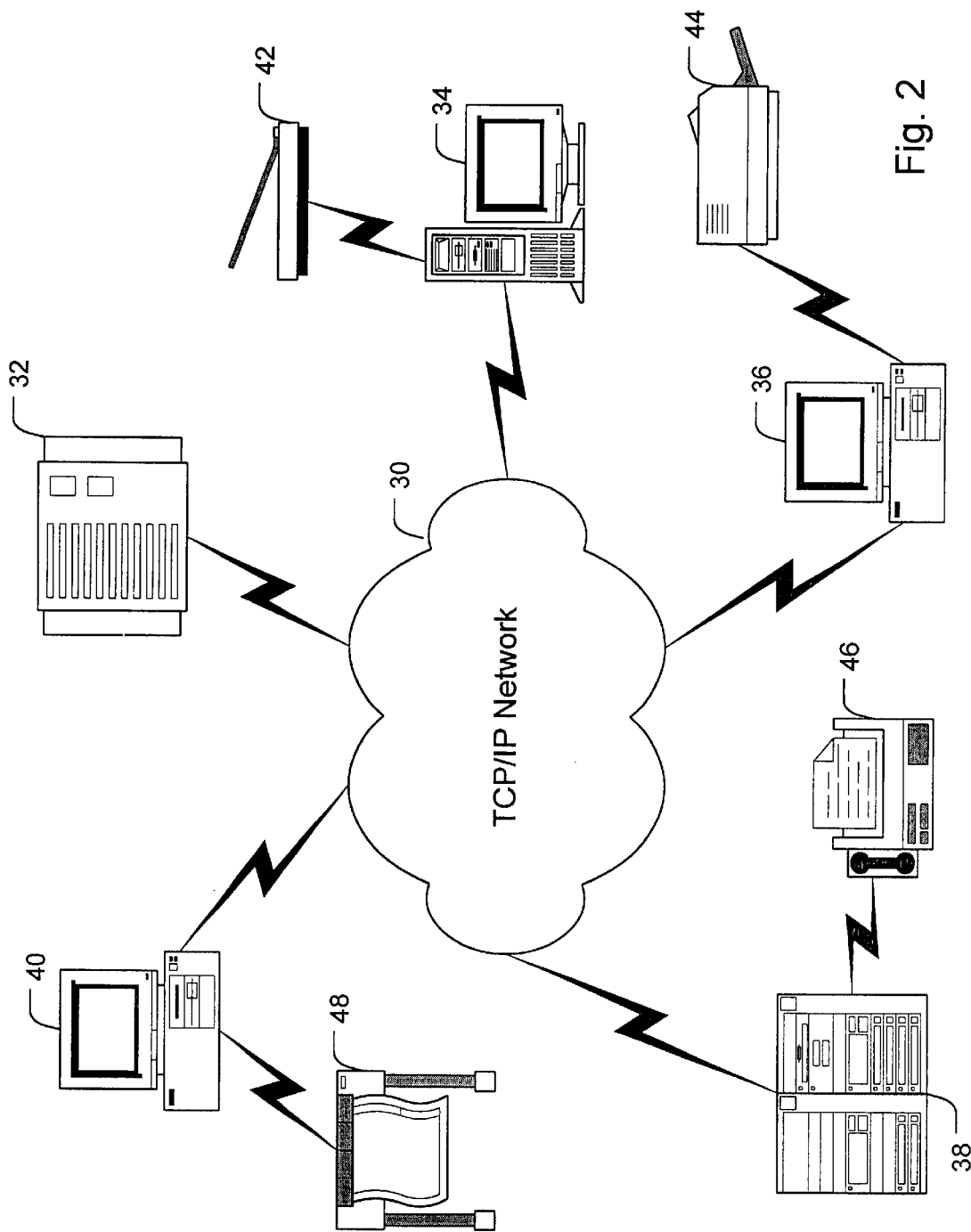
FIG. 2 illustrates a distributed network based upon TCP/ IP where there are a number of servers providing access to other services or devices.

Referring to FIG. 2, a presently preferred embodiment of the present invention is generally applicable to a distributed network 30 conforming to the TCP/IP standard, where the network can be the Internet or an intranet. Each of the agents 32, 34, 36, 38, and 40 has an HTTP server responding to HTTP requests, and may be connected to other devices and/or services such as a scanner 42, a printer 44, a fax machine 46, or a plotter 48. To access each agent, the IP address of the respective agent is used. The format of an IP address is comprised of four parts separated by periods (".") where each part may have a value in the range from 0 through 255 (e.g., 15.125.212.9).

As part of the preferred embodiment, a management scope is first defined to specify the range or ranges of IP addresses and ports for detecting the available agents. IP addresses in the management scope may be specified as exact addresses (e.g., 9.112.40.50), or may use dashes ("-") and/or asterisks ("*") to designate a range of addresses. For example, the dash may be used to indicate that the IP address is within a particular range (e.g., 9.112.50.1–40). The asterisk may be used as a wild card to indicate that one or more parts of the IP addresses are any one of the allowable values between 0 through 255 (e.g., 9.112.*.*). Dashes and asterisks may be combined in a single IP address specification (e.g., 9.112.1–40.*).

As part of the management scope, port numbers where agents may be listening are also collected. Port numbers generally correspond to device types and have values from 1 through 65535. Thus, if a particular type of device is of particular interest, the port number corresponding to the device type can be specified to determine the availability of such type of device. From the defined management scope, range or ranges of IP addresses and port numbers can be generated and stored in a registry (or list).

Figure 3:
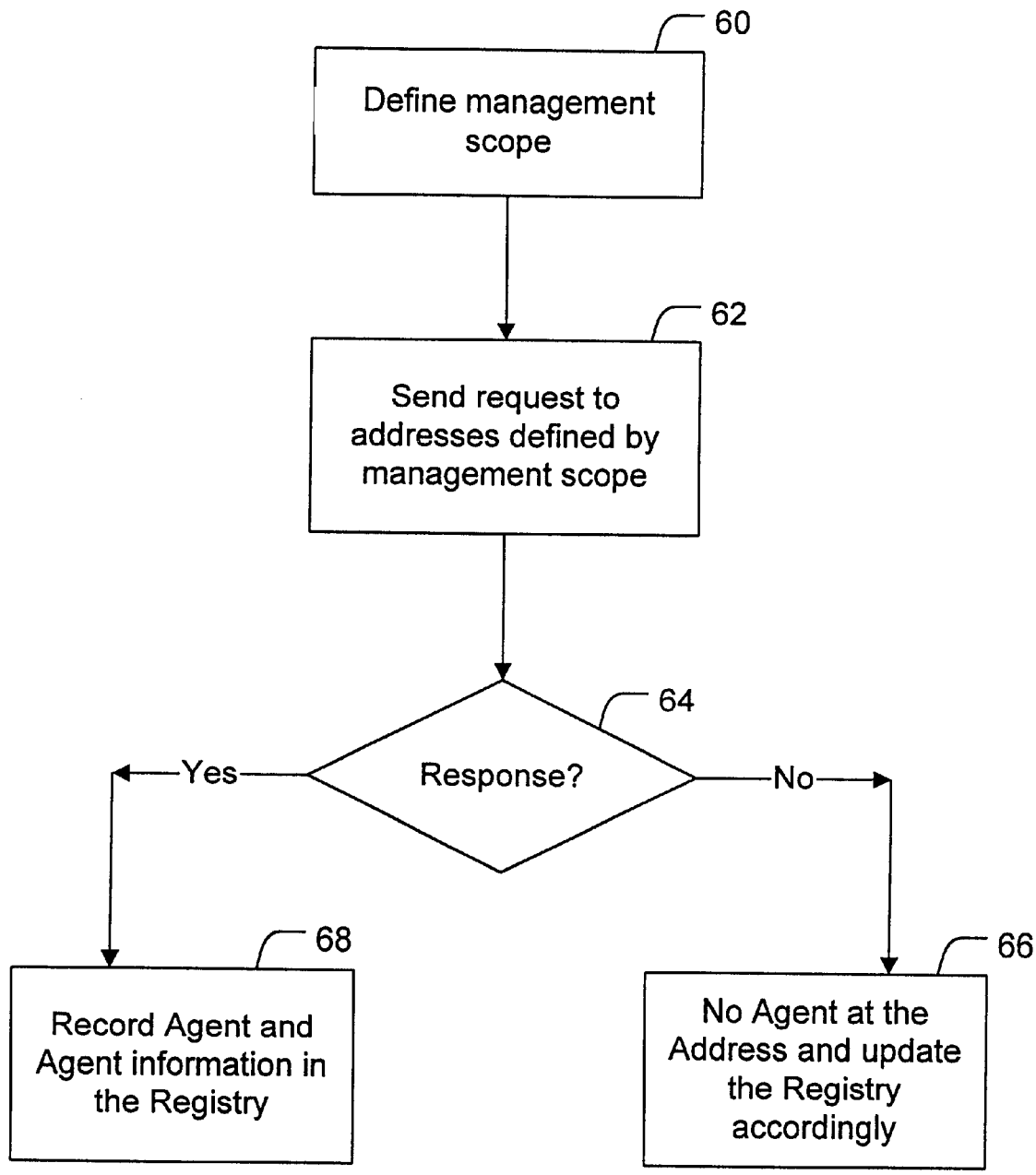
FIG. 3 is a flow chart generally illustrating the principal steps of the preferred embodiment of the present invention.

Referring now to FIG. 3, in a first step 60 of the preferred embodiment of the present invention, the predefined management scope is processed to generate a list of addresses for detecting agents that might be at the specified addresses. In the alternative, if the list of addresses has been previously generated and stored, it can be fetched and used. Once the addresses are made available, an attempt is made to detect agents at the specified addresses and ports at scheduled intervals (step 62).

To detect agents, an attempt is made to open a socket connection to the specified address and a request in HTTP is sent to the agent at the specified addresses. The HTTP protocol is based on a request/response paradigm. A client establishes a connection with a server and sends a request thereto in the form of a request method and a protocol version, followed by a MIME-like message containing request modifiers, client information, and possible body content. The server responds with a status line, including the message's protocol version and a success or error code, followed by a MIME-like message containing server information, entity meta-information, and possible body content.

In the preferred embodiment, an example of a HTTP request line using the GET method is as follows:
GET/HTTP/1.0

This command causes the retrieval of the default page of the agent at the specified address.

If an agent is available at a particular address, the HTTP or web server of the agent will respond to such a request with a default HTML page. This page can be a simple home page or an authentication page prompting for user information and password. This HTML page can be customized to include META statements within the header section of the HTML page. META statements are user provided information about the type of data in the respective HTML page and it can be written to specify any information as desired. Since META statements are a part of the header section and are not visible when the HTML page is displayed, if the META statements are properly prepared to provide information regarding the agent, the processing of the header section alone would be sufficient to extract information pertaining to the agent. By processing only the header section, this process is extremely fast.

In preparing the META statements, the NAME and CONTENT tags help facilitate the identification of information. For example, the following statements are an example of the use of the META statements in an HTML page describing the agent:

<HTML>

<HEAD>

<TITLE>Kona Agent Response</TITLE>

<META NAME="IBMproduct" CONTENT="Device Agent">

<META NAME="IBMproductVersion" CONTENT="1.1.0">

. . .

</HEAD>

. . .

</HTML>

Here, as provided under HTML protocol, the NAME attribute is a name for the type of information provided, and the CONTENT attribute describes the information associated with NAME. In the above example, the IBM product type is Device Agent and the product version is 1.1.0. By properly preparing the NAME and CONTENT fields, information pertaining to the agent is supplied by the agent and can be received by the requesting party through simple commands. Information that may be provided includes host name, IP address, operating system and version information, device driver information including version information, Java virtual machine version, security status or level, etc.

Thus, if the targeted agent responses to the HTTP request 68 and if the agent is not already in the agent registry, an entry is added in the agent registry with regard to this particular agent. If the agent is already in the agent registry, information in the registry is verified and updated against the newly obtained information. If the targeted agent does not respond 66 (socket time out condition), the agent registry is updated accordingly. Note that the process in detecting agents and updating the registry can be performed at scheduled intervals.

As an extension of the present invention, with the information obtained from the agent, the agent can be manipulated and controlled in a variety of manners. For example, if the agent of a particular device reports that the device is running an older version of the driver software for the device, a request can be sent to the agent to automatically download the latest version of the driver software from a specified server and run the latest version. In this manner, automatic download and update is made possible and the device is always running the latest software. In yet another feature, by knowing the security status or level of the device, the security status or level can be changed by a manager, thereby permitting central control over device security. Still another aspect in utilizing and extending the present invention is to provide a storage device information collection function whereby storage information such as capacity, free space, memory size, hardware architecture, etc. are collected and reported. Additionally, the information from each agent can be collected over time to provide for historical storage analysis of the space utilization trend for each agent.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for discovering and registering agents on a network, comprising the steps of:
   (a) defining a management scope indicating one or more ranges of network addresses and ports, wherein said network addresses conform to TCP/IP format, and wherein said ports are identified by port numbers that correspond to agent types;
   (b) processing said management scope to generate a plurality of specified network addresses; and
   (c) sending a request for information to each of said specified network addresses;
   (d) receiving a response from an agent at a particular port number at a particular one of said network addresses, said response including one or more meta statements identifying said agent and also identifying at least one type of service provided by said agent; and
   (e) registering said agent as being at said particular network address and port number.

2. A method as recited in claim 1 further including the steps of:
   (d) timing out for a response at a selected one of the network addresses; and
   (e) recording information indicating that no available agent has responded at said particular network address.

3. A method as recited in claim 2 wherein the amount of time for timing out for a response is adjustable.

4. A method as recited in claim 1 wherein said request conforms to HTTP protocol.

5. A method as recited in claim 1 wherein said response is in HTML format.

6. A machine readable storage device having instructions encoded therein for executing a method comprising the steps of:
   (a) defining a management scope indicating one or more ranges of network addresses and ports, wherein said network addresses conform to TCP/IP format, and wherein said ports are identified by port numbers that correspond to agent types;
   (b) processing said management scope to generate a plurality of specified network addresses; and
   (c) sending a request for information to each of said specified network addresses;
   (d) receiving a response from an agent at a particular port number at a particular one of said network addresses, said response including one or more meta statements identifying said agent and also identifying at least one type of service provided by said agent; and
   (e) registering said agent as being at said particular network address and port number.

7. A machine readable storage device as recited in claim 6 wherein said request conforms to HTTP protocol.

8. A machine readable storage device as recited in claim 6 further comprising the steps of:
   (d) timing out for a response at a selected one of the network addresses; and
   (e) recording information indicating that no available agent has responded at said selected network address.

9. In a computer network connecting a plurality of servers each identifiable by an unique network address and each having an agent for providing access to a service or a device, an improved method for discovering and registering said agents on said computer network, comprising the steps of:
   (a) defining a management scope indicating one or more ranges of network addresses and ports, wherein said network addresses conform to TCP/IP format, and wherein said ports are identified by port numbers that correspond to agent types;
   (b) processing said management scope to generate a plurality of specified network addresses;
   (c) sending a request for information to each of said specified network addresses;
   (d) receiving a response from an agent at a particular port number at a particular one of said network addresses, said response including one or more meta statements identifying said agent and also identifying at least one type of service provided by said agent; and
   (e) registering said agent as being at said particular network address and port number.

10. An improved method as recited in claim 9 further comprising the steps of:
    (d) timing out for a response at a selected one of the network addresses; and
    (e) recording that no agent is currently available at said selected network address.

11. A system for discovering and identifying agents on a distributed network, said distributed network connecting a plurality of servers each uniquely addressable via a network address and each having an agent for responding to service requests, comprising:
    (a) means for defining a management scope indicating one or more ranges of network addresses and ports, wherein said network addresses conform to TCP/IP format, and wherein said ports are identified by port numbers that correspond to agent types;
    (b) means for processing said management scope to generate a plurality of specified network addresses;
    (c) means for sending a request for information to each of said specified network addresses;

(d) means for receiving a response from an agent at a particular port number at a particular one of said network addresses, said response including one or more meta statements identifying said agent and also identifying at least one type of service provided by said agent; and (e) means for registering said agent as being at said particular network address and port number.

12. A system as recited in claim 11 further including:

(d) means for timing out for a response at a selected one of the network addresses; and (e) means for recording that no agent is currently available at said selected network address.

* * * * *